United States Patent
Giancola et al.

[11] Patent Number: 5,407,006
[45] Date of Patent: Apr. 18, 1995

[54] PNEUMATIC TIRES HAVING A TORIC PROFILE AT HIGH TRANSVERSAL CURVATURE

[75] Inventors: Guido Giancola, Milan; Michele Orlandi, Vaprio d'Adda, both of Italy

[73] Assignee: Pirelli Coordinamento Pneumatici S.p.A., Milan, Italy

[21] Appl. No.: 238,350

[22] Filed: May 5, 1994

Related U.S. Application Data

[60] Continuation of Ser. No. 970,841, Nov. 3, 1992, abandoned, which is a division of Ser. No. 630,168, Dec. 19, 1990, Pat. No. 5,209,797.

[30] Foreign Application Priority Data

Dec. 19, 1989 [IT] Italy ............................. 22 730 A/89

[51] Int. Cl.⁶ ..................... B60C 9/18; B60C 9/20
[52] U.S. Cl. ..................... 152/538; 152/526
[58] Field of Search ............. 152/526, 527, 528, 535, 152/538; 156/130, 123, 124, 126, 127

[56] References Cited

U.S. PATENT DOCUMENTS

| | | | |
|---|---|---|---|
| 4,288,265 | 9/1981 | Pacciarini et al. | 156/126 |
| 4,392,899 | 7/1983 | Bertoldo | 156/127 |
| 4,589,461 | 5/1986 | Ohkuni et al. | 152/538 |
| 4,770,222 | 9/1988 | Mezzanotte . | |
| 5,032,198 | 7/1991 | Kojima et al. | 156/123 X |

FOREIGN PATENT DOCUMENTS

| | | |
|---|---|---|
| 0346047 | 12/1989 | European Pat. Off. . |
| 2430495 | 1/1976 | Germany . |
| 485401 | 5/1938 | United Kingdom . |
| 2223988 | 4/1990 | United Kingdom . |

*Primary Examiner*—Geoffrey L. Knable
*Attorney, Agent, or Firm*—Stevens, Davis, Miller & Mosher

[57] ABSTRACT

The invention refers to the manufacture of a pneumatic tire having a toric profile at high transversal curvature wherein the reinforcing annular structure and the tread band are shaped together, starting from a cylindrical configuration to the final topic profile, in a single shaping step, before being assembled to the carcass, the step for vulcanizing the pneumatic tire being carried out without requiring a further shaping of the pneumatic tire.

5 Claims, 3 Drawing Sheets

PNEUMATIC TIRES HAVING A TORIC PROFILE AT HIGH TRANSVERSAL CURVATURE

This application is a continuation application of Ser. No. 07/970,841 filed Nov. 3, 1992, now abandoned, which in turn is a divisional application of Ser. No. 07/630,168 filed Dec. 19, 1990, now U.S. Pat. No. 5,209,797.

BACKGROUND OF THE INVENTION

The present invention relates to a process for manufacturing pneumatic tires having a toric profile with a high transverse curvature, comprising a carcass, a tread band and a reinforcing annular structure, also known as belt, inserted between said carcass and said tread band.

Particularly, the invention concerns processes for preparing a tire carcass separately from the assembled tire, that assembly comprising a reinforcing annular structure and a tread band and then transferring said assembly onto the carcass for assembling and torically shaping the whole pneumatic tire.

As known, pneumatic tires having a high transverse curvature are those especially suitable for equipping two wheel vehicles such as motorcycles which, when cornering, operate with camber angles of 50° or even 60°, values which are impossible to reach with conventional pneumatic tires for motor vehicles having a usual flat transverse profile.

In the manufacture of these pneumatic tires having a high transverse curvature a process is known comprising the steps of preparing the reinforcing annular structure separately from the carcass by radially superimposing layers of rubberized fabric reinforced with mutually crossed cords, in a known way, and of superimposing a tread band upon this reinforcing structure, before being assembled to the carcass.

In more detail, these pneumatic tires are usually manufactured by preparing the carcass on a suitable expansible building drum, in cylindrical configuration, and then bringing the configuration of the carcass to a first toric shape. Then two coaxial hollow supports are moved near the carcass sidewalls, said supports having a radially outer cylindrical surface (the well known bells) and a diameter like that of the carcass in the above said first toric shape. By means of said supports it is possible to arrange on said carcass, at its center line left free by the bells, in flat configuration and for subsequent steps, the reinforcing layers and the tread band, making them adhere the one to the other and to the carcass center line portion by stitching of the central portion of the assembly constituted by the reinforcing layers and the tread band.

At this stage the bells are moved away and the lateral zones of the assembly are stitched so as to make the remaining portions (lateral) of the reinforcing layers and tread band adhere to the carcass, which meanwhile is shaped according to a second toric configuration.

The so obtained green tire is therefore inserted into the Vulcanizing mould where it undergoes a further shaping consisting of an increase of the circumferential development of the tire of about 5%, during which the tread pattern is molded into the tread band.

A second known process consists of preparing the carcass in the form of a cylindrical sleeve on a main expansible drum, preparing on a separate ancillary drum the reinforcing annular structure, expanding said ancillary drum so far as to bring said reinforcing annular structure to a first toric configuration, applying the tread band on the so shaped annular structure stitching it with suitable means in order to provide it with the same toric configuration as the above said annular structure, transferring the assembly constituted by structure and tread band in correspondence of the carcass midplane, coaxially to the same, and expanding this carcass to the same toric configuration as the assembly in order to effect the assembling of the two elements and consequently the green tire to be vulcanized. This process and the relative apparatus are described in the Italian patent No. 1,099,513 (U.S. Pat. No. 4,288,265) of the present assignee.

Also in this case vulcanization of the pneumatic tire takes place in the conventional way, after having brought the above said pneumatic tire to its final toric shaping inside the mold.

The above processes cause different difficulties and problems owing to the stitching operation exerted on the tread band and to the final configuration carried out inside the mold, which result in a product that does not correspond to the qualitative characteristics required; in fact, the stitching is a very strong operation that causes deformations in the tread band with transfer of elastomeric material from the center towards the ends of the band (in this operative step the band is still in the green state, i.e. plastic state) as well as uncontrollable and undesired angular variations of the reinforcing cords of the belt layers and also of those of the carcass plies, both when the stitching is carried out after the assembling of the annular element (belt/tread assembly) to the carcass, and during the shaping inside the mould. All these drawbacks produce a decrease in quality of the resulting pneumatic tire. Today such variations no longer are tolerable in view of the high performance required not only in racing use, but also in less demanding uses such as normal tourist use.

SUMMARY OF THE INVENTION

Therefore the aim of the present invention is to solve the problems of the known technique by use of a process for manufacturing pneumatic tires having a toric profile at high transverse curvature, which enables control of the variation of the geometric characteristics of the pneumatic tire structure, in particular the angles of the reinforcing cords of the belt layers along the whole longitudinal development of the cords, from one end to the other of the layer, in consequence of which the conditions of the vulcanized tire are those foreseen at the beginning and especially the above said angles are those desired to be acheived.

Therefore, according to a first aspect, the present invention is directed to a process for manufacturing pneumatic tires having a toric profile with high transverse curvature. These tires have a carcass, a tread band on the crown of said carcass and a reinforcing annular structure, interposed between said carcass and said tread band (in particular at least one radially superimposed layers of rubberized fabric provided with reinforcing cords inclined with respect to the circumferential direction of the tire, parallel to each other in any layer and crossing those of the adjacent layers). The process of the invention comprising the steps of preparing separately each of said carcass, said tread band and said reinforcing annular structure. The process includes assembling to said carcass an annular element comprising said reinforcing annular structure and said tread band, assembled together and already torically shaped, to form a complete green pneumatic tire and vulcanizing said green pneumatic tire inside a mould, said process being characterized by the fact of assembling said tread band to said reinforcing annular structure before the shaping step, so as to have said annular element in a cylindrical configuration, and of shaping said annular element according to its final toric configuration, at high transverse curvature, before being assembled to said carcass.

According to another aspect the present invention is directed to a pneumatic tire for vehicle wheels, of the type having a toric profile with high transverse curvature provided with a carcass and a tread band positioned as a crown on said carcass. The tire includes a reinforcing annular structure interposed between said carcass and said tread band (in particular comprising radially superimposed layers of rubberized fabric provided with reinforcing cords inclined with respect to the circumferential direction of the tire, parallel to each other within a layer and crossing those of the adjacent layers). The inclination angle of said reinforcing cords in the vulcanized pneumatic tire lies between 10° and 35°, the value of said angle at the mid-circumferential plane being lower than the value at the ends of said reinforcing annular structure.

In particular the present invention concerns the pneumatic tire referred to above obtained by means of the process according to the invention.

According to a further aspect the present invention is directed to a machine for manufacturing pneumatic tires having a toric profile with high transverse curvature, provided with a carcass, a tread band positioned as a crown on said carcass and a reinforcing annular structure interposed between said carcass and said tread band. The machine for manufacture of the tire comprises a main drum for shaping a carcass of cylindrical configuration into a toric configuration and an ancillary drum for building-up and shaping said reinforcing annular structure. The ancillary drum comprises a cylindrical drum of predetermined diameter for building-up said annular structure according to a cylindrical configuration and an expansible drum for the subsequent toric configuration of said annular structure. The expansible drum comprises a plurality of sectors having a radially outer toric profiler movable in a radial direction for coupling with the radially inner surface of said annular structure so as to shape its toric configuration, and means for transferring at least said reinforcing annular structure from said expansible drum, coaxially around said carcass, onto said main drum. The machine is characterized by the fact that said radially movable sectors have an outer profile substantially corresponding to the toric profile at high transverse curvature of the radially inner surface of the vulcanized pneumatic tire.

Preferably, the radially outer toric profile of the above said sectors has a curvature comprised between 0.20 and 0.35.

BRIEF DESCRIPTION OF THE DRAWINGS

The present invention will be better understood by the following description made by way of non-limiting example, with reference to the attached sheets of drawing in which.

DETAILED DESCRIPTION OF PREFERRED EMBODIMENTS

Figure 1:
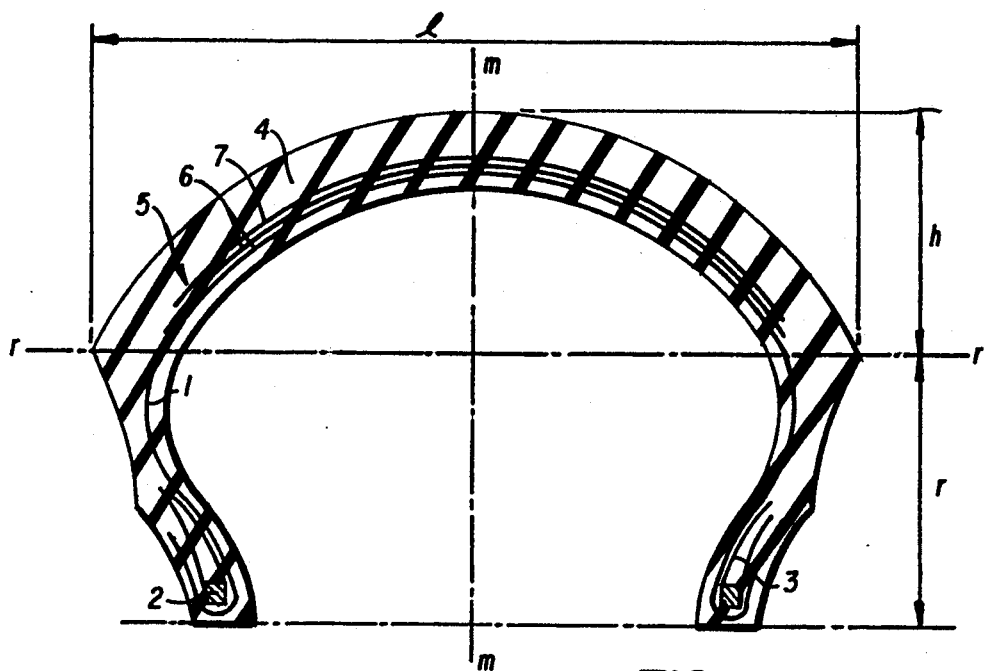
FIG. 1 is a cross section of a radial tire having a high transversal curvature, manufactured by means of the process according to the invention.

With reference to FIG. 1, the following description illustrates the most general type of radial tires to which the invention results are particularly applicable.

When the manufacture has been completed, the subject tire comprises a radial carcass 1 formed by one or more rubberized plies whose ends are turned up, as is generally per se known, around the bead cores 2, provided in a radially outer position with a bead filler 3 of high hardness elastomeric material. A tread band 4, upon which the tread pattern has been molded, is positioned on the crown of said carcass, and a reinforcing annular structure 5, usually well known as belt, is inserted between said tread band 4 and said carcass 1.

Figure 2:
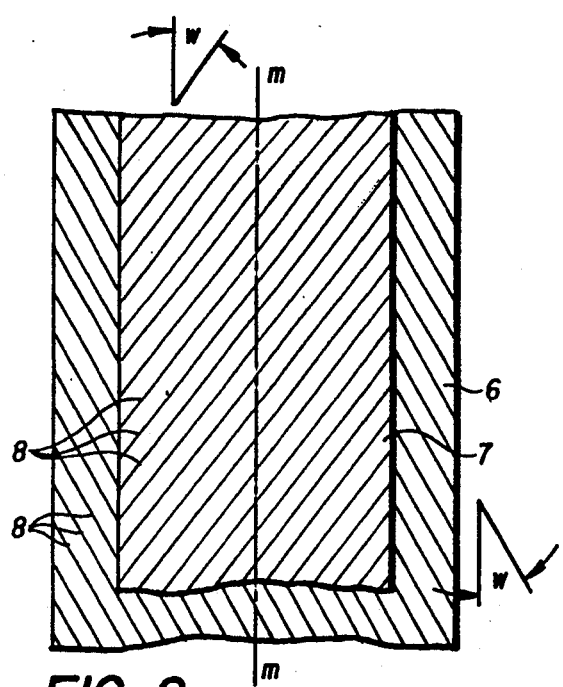
FIG. 2 shows a portion of the reinforcing annular structure, stressing the angle of the cords of the layers during the flat shaping (in cylindrical configuration) of the above structure.
Figure 3:
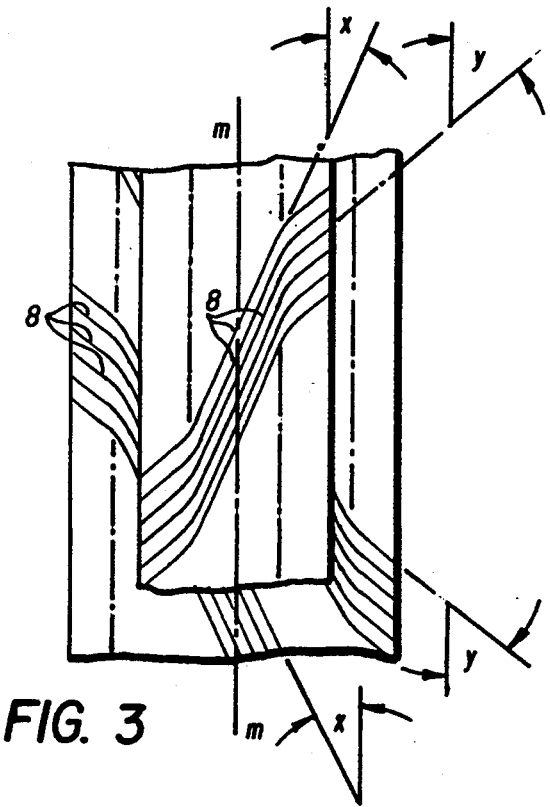
FIG. 3 shows the same portion of reinforcing annular structure on the tire, after vulcanization stressing the angular variations which occurred in the position of the above cords.

The said belt, which is as wide as the tread, comprises at least one, but more generally at least two layers 6, 7 of rubberized fabric provided with reinforcing cords 8 (FIG. 2) inclined with respect to the mid-circumferential or equatorial plane of the tire (center line m—m) at an angle between 10° and 35°; in the example shown the angle is equal to about 22°. These cords lie parallel to each other in each layer, crossing those of the adjacent layer or layers.

Very conveniently the above said cords may be of any suitable material, for instance any filament or yarn such as nylon, or Kevlar (registered trademark of Du Pont), or steel, etc.

Of course the belt can comprise other reinforcing layers, well known in the technology of the pneumatic tires and therefore not mentioned here without however affecting negatively the understanding of the invention.

The shown tire has a toric profile at high transverse curvature, i.e. it has a very winding tread, with an accentuated curvature at the crown, ending with two sharp edges at the ends, in the jointing zone with the sidewalls. The purpose of these sharp edges is that of notifying the driver upon reaching the limit camber angle before the vehicle loses stability and road holding.

The above said curvature is usually given by means of the value "f", i.e. of the ratio h/l, where h represents the radial height of the tread, measured at the mid-plane and with reference to line "r" (FIG. 1) passing through the edges of the tread and in this case also tangent to the end of the belt, and l represents the maximum width of the tread, measured as distance between the said edges.

In particular, for the pneumatic tires of the invention the value of "f" is comprised between 0.20 and 0.35.

In its most general form the plant for manufacturing the above mentioned pneumatic tires is conveniently that described in the Italian patent No. 1,099,513 (or in the subsequent Italian Patent No. 1,133,894 (U.S. Pat. No. 4,392,899) concerning an improvement to give it a greater productivity), except for the changes which will be explained hereinafter, in accordance with the present invention, so that it is unnecessary to supply here a complete description. The complete disclosures of these patents are thus hereby incorporated by reference.

Figure 4:
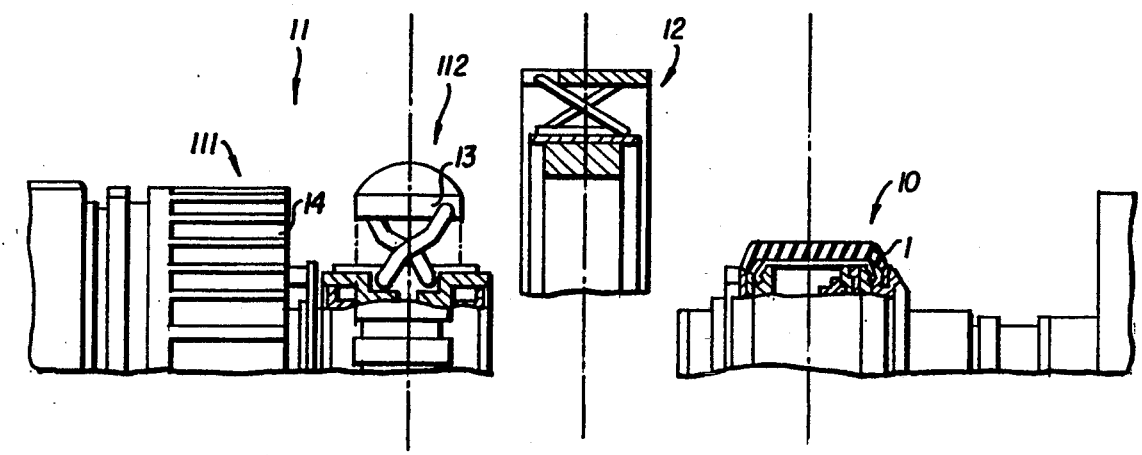
FIG. 4 is a plant for manufacturing the pneumatic tire of FIG. 1.

With reference to present FIG. 4, it is sufficient to remember that the above mentioned plant comprises a main drum 10 for building up the carcass 1 according to a cylindrical configuration and/or shaping it into a toric configuration. The plant includes an ancillary drum 11 for building up (in accordance with the present invention) an annular element comprising a belt and a tread band radially superimposed upon the belt, at first in cylindrical configuration (in flat configuration) and subsequently for shaping the above said annular element in its final toric configuration. This configuration substantially corresponds to that of the vulcanized tire. Means 12 is for transporting the so shaped annular element from the ancillary drum 11 to the main drum 10 so as to assemble the carcass to the annular element, through the expansion of the carcass against the corresponding inner surface of the above said annular element.

For a better understanding, it is briefly called to mind that the ancillary drum 11 is formed by two distinct coaxial parts 111, 112 preferably axially separable from each other, integral to each other in rotation when they are mutually coupled and one freely rotating with respect to the other when they are separated.

One of the two parts, constituting a well known "comb drum" 111, is formed by a plurality of teeth 14, circumferentially spaced from each other and arranged in such a way as to constitute a predetermined diameter cylindrical surface; the other part 112, radially expansible, is formed by a plurality of metal sectors 13 (FIG. 5) shaped according to a radially outer profile 13' (FIG. 5), novel with respect to the known plant, substantially corresponding to the toric profile at a high transverse curvature of the finished tire, or even better, of the radially inner surface of the tire.

Figure 5:
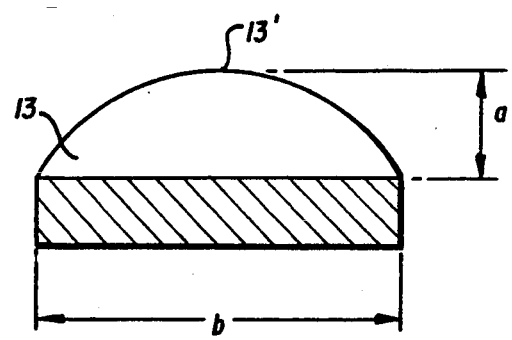
FIG. 5 shows the toric profile at high transverse curvature of the radially expansible sectors used for shaping the above said annular element.
Figure 6G:
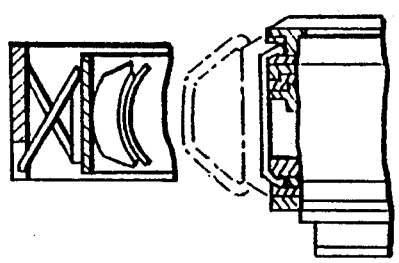
FIGS. 6A–6G and 7A–7F show the steps of the process for manufacturing a pneumatic tire according to the invention in comparison with the process steps carried out according to the previously known technique.
Figure 6F:
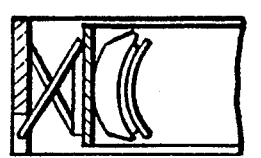
Figure 6E:
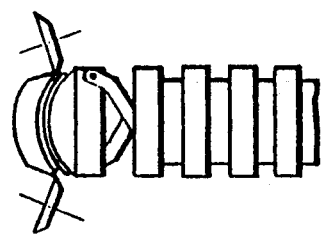
Figure 6D:
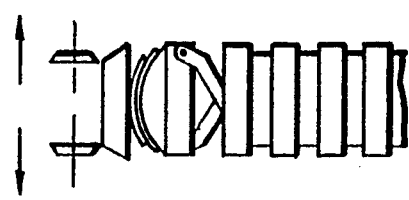
Figure 6C:
Figure 6B:
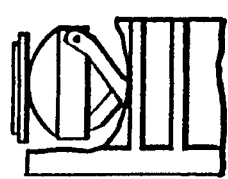
Figure 6A:
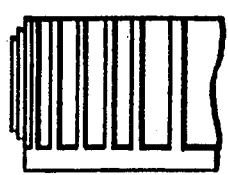

The shape of said profile can be conveniently identified by its "swelling", i.e. by the ratio a/b where "a" represents the maximum height of the curvilinear part of said profile, substantially coinciding with the toric profile of the finished tire, and "b" represents its maximum width, i.e. the distance between the two ends, as clearly shown in FIG. 5.

Said swelling is kept conveniently equal to the shape of the tire that is being made and consequently has a value between 0.20 and 0.35.

After the plant, the working process in accordance with the invention carried out for building-up the annular element that will be assembled to the carcass, is now explained with the aid of FIGS. 6 and 7, where the process of the invention is shown in the sequence of the operative steps in comparison with those carried out according to the known process of the prior art.

Figure 7F:
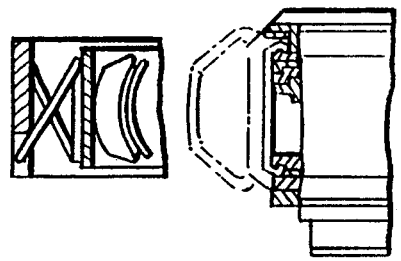
Figure 7E:
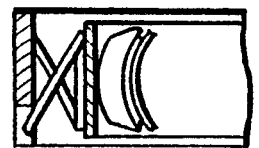
Figure 7D:
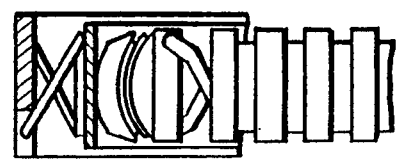

At first the ancillary drum is put under rotation in order to wind on the comb-shaped part, one after the other, the two reinforcing layers 6 and 7, splicing the opposite ends of each of them. Contrary to what happened in the process of the art according to which the above said layers were immediately shaped (FIGS. 6a, 6b, 6c), now the tread band is wound, possibly also pressing it slightly against the above said reinforcing annular layers (FIG. 7a).

Figure 7C:
Figure 7B:
Figure 7A:
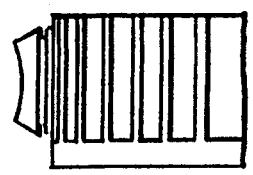

After having brought the expansible drum into the comb drum (FIG. 7b), by setting in action a suitable control, the sectors expand through the spaces of the comb teeth until said sectors support by themselves the annular element comprising the reinforcing layers and the tread band; it is clear that in this way the annular element loses its cylindrical shape to gain a toric configuration corresponding to that of the supporting sectors, and therefore a change to that of the finished pneumatic tire (FIG. 7c).

In this step the reinforcing cords of the layers effect a scissors movement that produces an angular variation of their inclination with respect to the tire mid-circumferential plane; more precisely speaking their inclination reduces, in a non-uniform manner along the development of the cords, in relation to the entirety of the radial expansion undergone point by point and to the initial value of said inclination angle.

For example in the tire prototype realized by the Applicant and shown herein, the above cords, arranged on the comb drum (FIG. 2) symmetrically according to an angle "w" of 30°, in each layer, in the vulcanized tire are arranged according to an angle "x" equal to 18° at the mid-circumferential plane and according to an angle "y" of 20° at the ends of the belt, with a continuous variation of the value of the inclination angle along the longitudinal development of the cords, with a difference of about 2° between the values of the angles between the mid-circumferential plane and the ends of the belt.

More generally, said angular variation (w-x) is preferably not less than 5° and not greater than 15°, so that in the finished pneumatic tire the reinforcing cords of the belt layers are arranged according to an angle smaller than that when laid on the comb drum; besides the value of said angle is less at the mid-circumferential plane than the value at the ends; said difference (y-x) is conveniently comprised within a maximum value of 5°.

During the radial expansion of the sectors 13 (FIG. 4) the drum 112 is unthreaded from the comb drum 111, releasing the same from rotation so as to make this latter immediately available for the beginning of another belt building cycle, and fitting the device 12 around the above said expansible drum 112 (FIG. 7d).

Now, in a known manner, the transporting means 12 withdraws the annular element (FIG. 7a) through the contraction of the sectors 13, then the annular element is transferred onto the main drum, in coaxial position and in correspondence of its mid-circumferential plane (FIG. 7f), around the carcass previously arranged in cylindrical form on the main drum, in a way functionally independent of the previous steps, and possibly already shaped in part; subsequently, the carcass is further shaped in a toric configuration against the radially innermost layer of the annular element in order to assemble the two parts of the pneumatic tire; finally the complete tire is withdrawn from the main drum and sent to the vulcanizing step inside the mould.

The so realized pneumatic tire before being removed from the main drum can be subject to a stitching operation carried out with known disc devices to obtain a strong adhesion of the elements assembled together and the elimination of possible air bubbles remained entrapped during the assembling step. It is clear that this fixed disc device at this stage of the process is not able to cause any deformations of the pneumatic tire structure.

Also it is to be noted that by means of the process according to the invention the pneumatic tire reaches its final configuration formerly on the building machine, so that in the mould it suffers only a slight "dilatation", i.e. a further expansion of the carcass, necessary for vulcanizing the pneumatic tire with the belt in an initial tension state (pretension), measurable as an increase of the circumferential development of the pneumatic tire, at most of the order of 1.5%, that is not sufficient to change the toric configuration thereof.

A pneumatic tire manufactured according to the steps of the present invention achieves surprisingly better results.

Firstly the tread band is torically shaped together with the reinforcing annular structure and not subsequent to the shaping thereof, and said shaping takes place in consequence of the radial expansion of a suitable supporting surface that makes it possible for the rubberized fabric layers laid therein, and for the tread band all those movements produced by the passage of the annular element from a cylindrical configuration of a given diameter to a toric configuration of greater diameter.

Moreover the carcass is shaped torically and definitively against the annular element already torically shaped in its final form and not viceversa.

This operation of adapting perfectly the carcass to the final profile of the reinforcing annular element reduces considerably for the annular element any stretching due to the strong adaptation action that, during the stitching step, said element would need to undergo during the assembling to the carcass.

In fact, in this way having eliminated the stitching of the tread band on the reinforcing annular structure (FIGS. 6d, 6e) already torically shaped, as well as the shaping of the reinforcing structure already assembled to the shaped carcass, all those uncontrollable deformations of the structural geometry of the pneumatic tire including particularly the arrangement of the carcass and belt reinforcing cords have been avoided. Said deformations tend to limit qualitatively the performance of the pneumatic tires forming the object of the present invention.

This result overcome the known technical prejudice to the effect that it was not possible to obtain a uniform and homogeneous expansion of the reinforcing annular element in the presence of the tread band before its assembling to the carcass since the presence of the tread hampered the movement of the reinforcing cords during the shaping of the belt layer, altering the final tension state of the above said cords with the consequent reduction of the tire resistance in particular to the lateral and torsional stresses.

Also the elimination of the step of the final shaping inside the mould has produced a further benefit as regards the maintenance of the planned structural characteristics of the pneumatic tire during the building up process and consequently the quality of the finished tire.

In fact it is known that a reinforcing annular structure not corresponding to the uniformity and evenness characteristic in particular as regards the belt angles, compromises the handling characteristics of the tire, i.e. lowers the level of the performance in respect of steering response, lateral stability and insensitiveness to road roughness, causing the instability of the vehicle.

To sum up, when manufacturing a pneumatic tire in accordance with the process of the invention, the angular arrangement of the carcass cords does not suffer any alteration, while that of the belt cords changes in a uniform, regular, continuous manner at a controlled speed and not as a sequence of pulses (as in the case of the carcass/belt assembly shaping, where said angular variation is hampered by the friction with the carcass ply) or for imposed deformation, as in the presence of the stitching of the tread band on the belt, assuring therefore conformity of the tire to desired conditions and the qualitative level of the finished tire.

In confirmation of the above, when one cuts out sections of a vulcanized tire obtained with the process according to the invention one does not find wavings, lack of parallelism, wrong angulations and lying unevenness of the carcass and belt reinforcing cords as usually happens in pneumatic tires manufactured with the known processes and apparatuses.

In order to evaluate the qualitative improvements achieved by means of the tires manufactured according to the process of the invention, two different series of tests, on road and on track respectively, have been carried out, comparing the pneumatic tires of the invention at first (road tests) with those produced by the Applicant, according to the previous process already cited in the Italian patent No. 1,099,513 (U.S. Pat. No. 4,228,265), and then (track tests) with equivalent tires produced by other manufacturers, in extreme conditions.

The characteristics of the vehicle used are the following ones:

| MOTORCYCLE | YAMAHA FRZ 1000 |
| --- | --- |
| Front tire | size 120/70 ZR 17 |
| inflation pressure | 2.5 bar |
| rim | 3.50–17 |
| Rear tire | size 160/60 ZR 18 |
| inflation pressure | 2.9 bar |
| rim | 4.50–18 |

The road test consisted of valuing the qualitative level of the more important handling characteristics especially depending on the reinforcing annular structure, assigning a value (from 0 to 10) to each one of the considered characteristics.

Table 1 gives the result of the comparison between the pneumatic tires of the invention (type A) and those manufactured by the same Applicant according to the old process (type B) referred to above.

TABLE 1

| TESTS/TIRES | type A | type B |
| --- | --- | --- |
| SHIMMY | 7 | 4 |
| HANDLING | 6.5 | 4.5 |
| SPEEDY RESPONSE | 6 | 4.5 |
| STEERING STABILITY | 7 | 6 |
| DRY ROAD HOLDING | 7 | 6.5 |
| COMFORT | 6 | 5.5 |
| MEAN VALUE | 6.65 | 5.14 |

The track test that has considered other characteristics more specifically connected to the type for severe use, has been carried out by comparing two different types of pneumatic tires manufactured according to the process of the invention, with equivalent tires (i.e. homologated for the same type of use and vehicle, i.e. a YAMAHA motorcycle) of the best brands sold on the market.

Here it is to be noted that the tested characteristics are not the structural characteristics of the different compared tires, that are not known, by only their global behavior influenced by all the characteristics of the final product: for instance the tire of the invention is lighter (about 1.5 kg., with all the advantages achieved) than the compared tires.

Moreover the purpose of the test was that of valuing the global effect of the invention in comparison with the better equivalent pneumatic tires available on the market.

A value was allotted to each one of the examined characteristics, after that the arithmetical mean of the global vote achieved by each type of tire has been calculated.

TABLE 2

| TIRES | MEAN VALUE |
|---|---|
| TIRE OF THE INVENTION (1st version) | 7 |
| TIRE OF THE INVENTION (2nd version) | 6.8 |
| TIRE A | 6.8 |
| TIRE B | 6.65 |
| TIRE C | 6.2 |
| TIRE D | 6 |
| TIRE E | 5.5 |

Table 2 gives the result of said comparison, being the tires of the other manufacturers indicated with A, B, C, D, and E. The improvement achieved by the tires according to the invention with respect to those of the art appears immediately clear.

Finally it is stressed that the apparatus and the process in accordance with the invention have been described according to an example of preferred embodiment and of particularly advantageous construction so that it is clear that the present invention includes all those modifications and variants, even if not explicitly described herein, however easily deducible from the present inventive idea by those skilled in the art.

We claim:

1. A pneumatic tire having a toric profile of high curvature, said tire having a carcass, a tread band around said carcass and a reinforcing annular structure interposed between said carcass and said tread band, said structure having radially superimposed layers of parallel rubberized cords inclined with respect to a mid-circumferential plane of said annular structure, said tire being formed by a process comprising the steps of separately forming each of said carcass, said tread band and said reinforcing annular structure, said annular reinforcing structure being in cylindrical shape, with the cords of said annular structure lying at a first angle of inclination with respect to the mid-circumferential plane of said annular structure, assembling said tread band to said reinforcing annular structure so as to form an annular element in a cylindrical configuration, then shaping said annular element into its final toric configuration with a high transverse curvature so as to move said cords from said first angle of inclination to a second angle of inclination with respect to the mid-circumferential plane of the annular element, then assembling said carcass to said toric shaped annular element to form a complete green pneumatic tire, then vulcanizing said green pneumatic tire inside a mold.

2. The tire of claim 1 in which the second angle of inclination of said cords is 5° to 15° less than said first angle of inclination.

3. The tire of claim 1 in which said cords at the axial ends of the annular element lie at an angle which differs from the angle at the mid-circumferential plane by a value of not greater than 5°.

4. The tire of claim 1 in which the process of forming includes subjecting said reinforcing annular structure, shaped in its final configuration, to a further deformation of not more than 1.5% of its circumference through expansion of the green tire inside the mold.

5. The tire of claim 1 in which the angle of inclination of said cords continuously increases from a first value at the mid-circumferential plane to a second value at the axially outer ends of the layers, the angle at said outer ends being not more than 5° greater than the angle at the mid-circumferential plane.

* * * * *